United States Patent [19]

Hazen

[11] 4,300,445
[45] Nov. 17, 1981

[54] APPARATUS FOR SEPARATING FINES FROM WHEY

[75] Inventor: Gretz L. Hazen, Fort Atkinson, Wis.

[73] Assignee: DEC International, Inc., Madison, Wis.

[21] Appl. No.: 40,073

[22] Filed: May 17, 1979

[51] Int. Cl.³ .................... A01J 25/00; A01J 25/11
[52] U.S. Cl. ............................. 99/458; 99/452; 209/352; 209/403; 210/456; 210/416.1
[58] Field of Search .............. 99/452, 456, 458, 459; 210/456, 416 R, DIG. 3; 209/352, 403, 250, 254; 193/25 R, 25 A; 222/63, 64; 366/90, 91

[56] References Cited

U.S. PATENT DOCUMENTS

| 262,702 | 8/1882 | Sears et al. | 210/416 R |
|---|---|---|---|
| 1,546,756 | 7/1925 | Schulze et al. | 99/458 |
| 2,797,702 | 7/1957 | Martin | 222/64 |
| 3,374,888 | 3/1968 | Volpert et al. | 209/403 |
| 3,606,945 | 9/1971 | Watson et al. | 209/352 |
| 3,887,718 | 6/1975 | Hinds, Jr. | 99/458 |
| 4,061,794 | 12/1977 | Charles | 99/458 |
| 4,113,626 | 9/1978 | Detcher | 210/456 |

FOREIGN PATENT DOCUMENTS 84912  11/1956  Netherlands ..................... 99/458

*Primary Examiner*—Philip R. Coe
*Assistant Examiner*—Timothy F. Simone
*Attorney, Agent, or Firm*—Andrus, Sceales, Starke & Sawall

[57] ABSTRACT

An apparatus for separating curd fines from whey including a closed housing having an inlet to receive whey that contains a substantial portion of curd fines. The whey is introduced onto an inclined delivery trough and is discharged from the lower end of the trough onto a stationary inclined screen which is inclined in the opposite direction from the delivery trough. In passing from the delivery trough to the screen the whey passes through a slot which distributes the whey in a thin layer over the screen. In flowing down the screen a portion of the whey drains through the screen and is collected in a whey bin, while the remaining portion of the whey and fines, in the form of a slurry, is collected in a separate bin and can be returned to the cheese making vat.

4 Claims, 5 Drawing Figures

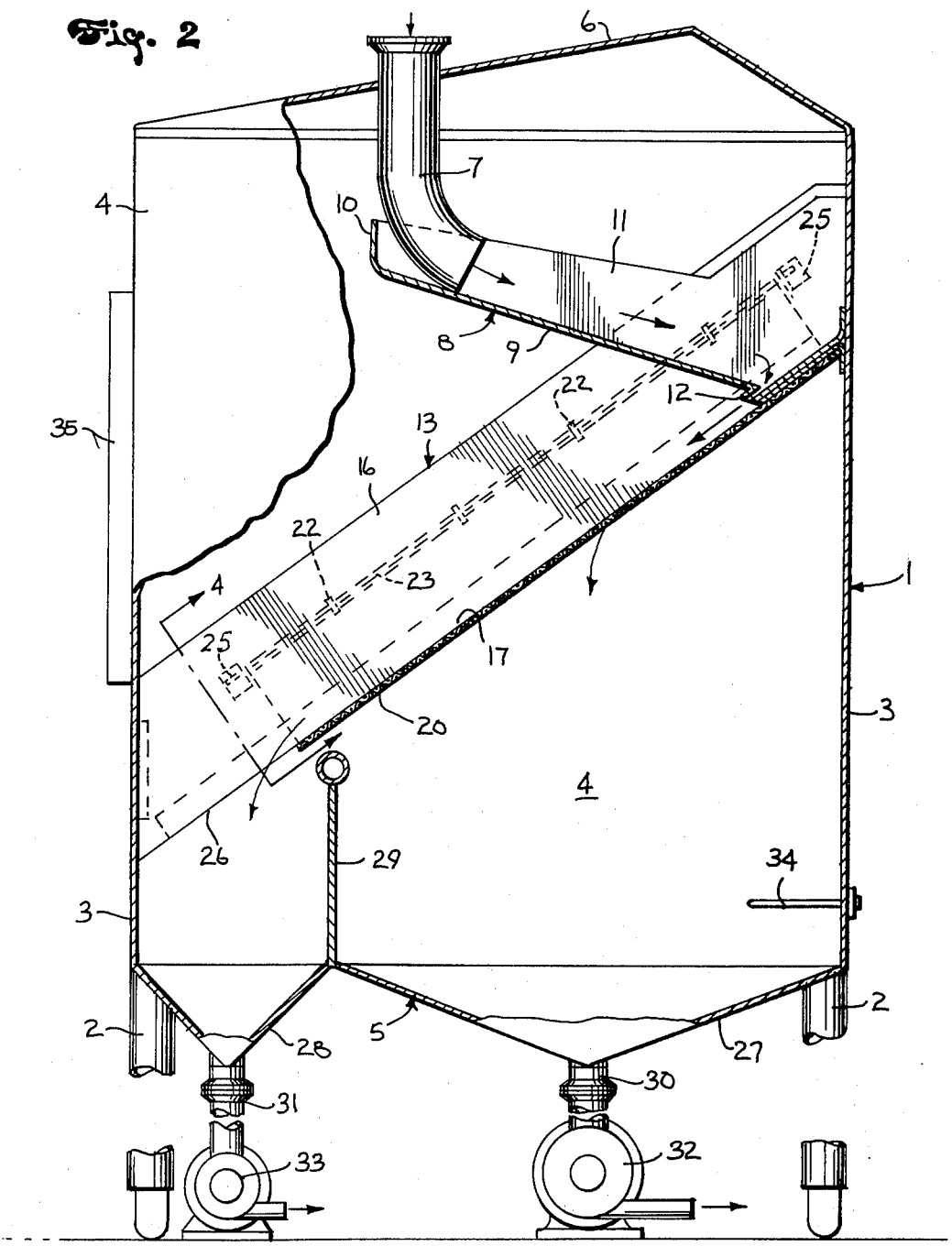
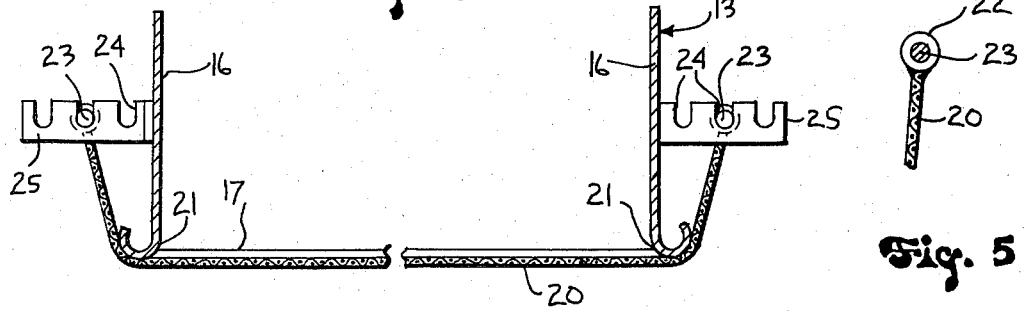

2

APPARATUS FOR SEPARATING FINES FROM WHEY

BACKGROUND OF THE INVENTION

In cheese making processes, the whey is drained from the curds and the whey can contain a substantial portion of curd fines. As the curd fines represent a valuable product, various types of separators and screens have been used in the past to separate the fines from the whey, such as disclosed in U.S. Pat. Nos. 2,942,343 and 3,071,860. In general, vibratory screens and dewatering screens have been used in the past to recover fines and in devices of this type the fines are normally exposed to air and therby tend to dry and clump together, resulting in a change in texture and color. Because of this, it is not normally possible to return the fines to the cheese making vat, because they produce an unacceptable change in texture and color in the cheese, thereby downgrading the cheese. Therefore, curd fines, after separation from the whey, are separately packaged and sold as a non-premium, lower priced product.

SUMMARY OF THE INVENTION

The invention is directed to an improved apparatus for separating curd fines from whey in a manner such that the curd fines are in a condition where they can be returned to the cheese making vat. The apparatus of the invention includes a closed housing having an inlet to receive the whey which contains a substantial portion of curd fines. The whey is introduced onto an inclined delivery trough, and is discharged from the low end of the trough onto a stationary screen which is located beneath the trough and is inclined in the opposite direction from the trough.

In passing from the delivery trough to the screen, the whey passes through a narrow slot which serves to distribute the whey in a thin stream or layer across the screen. As the whey flows downwardly over the screen, a portion of the whey drains through the screen and is collected in a whey bin, while the remaining portion of the whey and fines, in the form of a slurry, is collected in a second bin and can be immediately returned to the cheese making vat.

The angle of incline of the stationary screen is coordinated with the mesh size of the screen so that the major portion of the whey is removed, but the fines, along with a remaining portion of the whey, is discharged in the form of a thick slurry into the second collection bin. Thus, the fines do not dry out and there is no change in texture and color of the fines, thereby enabling the fines to be returned to the cheese making vat.

The separating apparatus of the invention is a simplified construction over vibratory screens, and other mechanical separating devices, as used in the past. The separator includes a stationary inclined delivery trough and a stationary inclined screen so that there are no moving parts, and this not only reduces the initial cost of installation and maintenance, but simplifies the cleaning procedure.

As the assembly is contained within a closed housing, the entire assembly can be readily cleaned-in-place without the removal of any of the components.

Other objects and advantages will appear in the course of the following description.

DESCRIPTION OF THE DRAWINGS

The drawings illustrate the best mode presently contemplated of carrying out the invention.

In the drawings:

FIG. 2 is a vertical section taken along line 2—2 of FIG. 1;

FIG. 4 is a section taken along line 4—4 of FIG. 2 and showing the mounting of the screen; and FIG. 5 is an enlarged view showing the attachment of the screen to the support rod.

DESCRIPTION OF THE ILLUSTRATED EMBODIMENT

Figure 1:
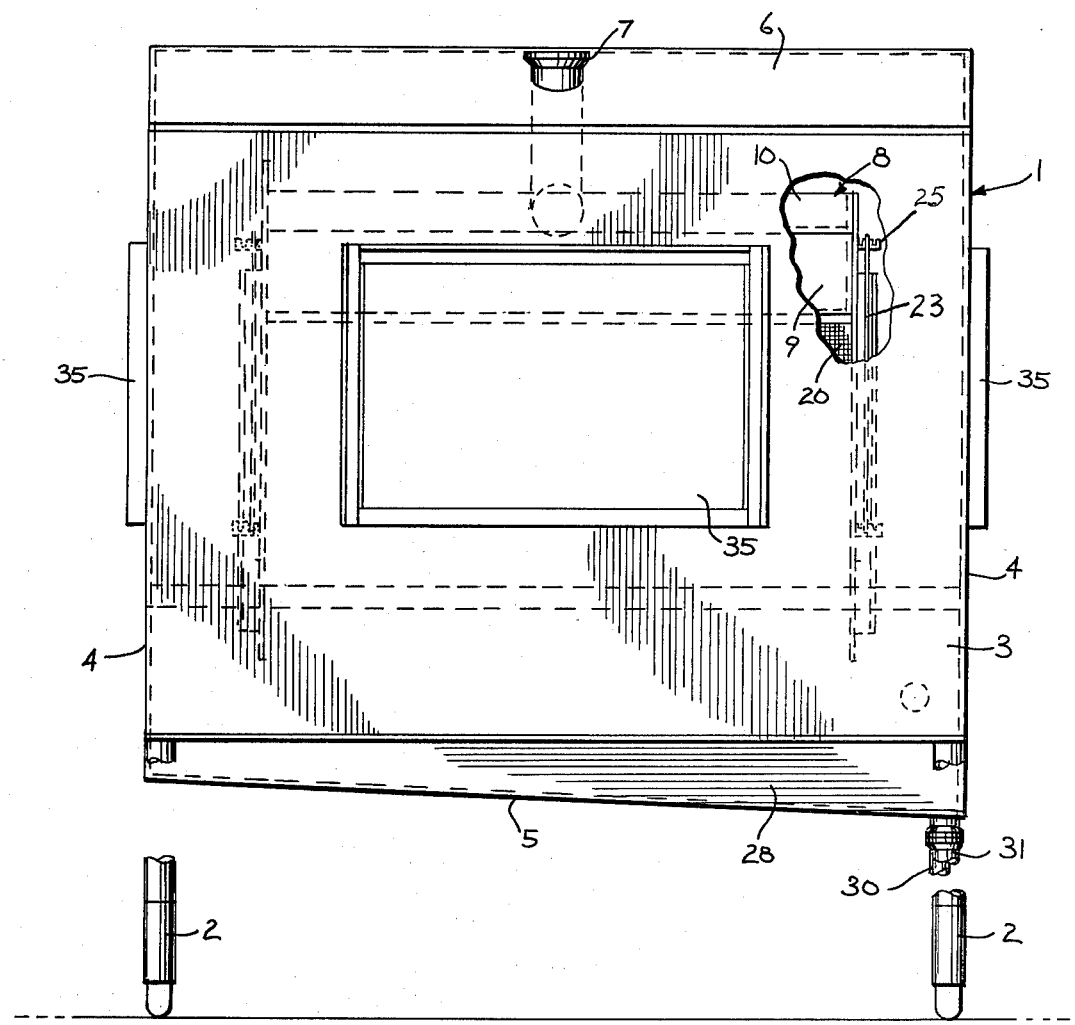
FIG. 1 is a side elevation of the apparatus with parts broken away in section.

The drawings illustrate an apparatus for separating curd fines from whey which includes a generally rectangular housing 1 that is supported on a series of legs 2. The housing includes a pair of side walls 3, a pair of end walls 4, a bottom wall 5, and a top 6.

The whey which contains a substantial portion of curd fines, is introduced into the housing through an L-shaped conduit 7 and is discharged onto an inclined, stationary delivery trough 8 which is mounted in the upper portion of the housing.

Figure 3:
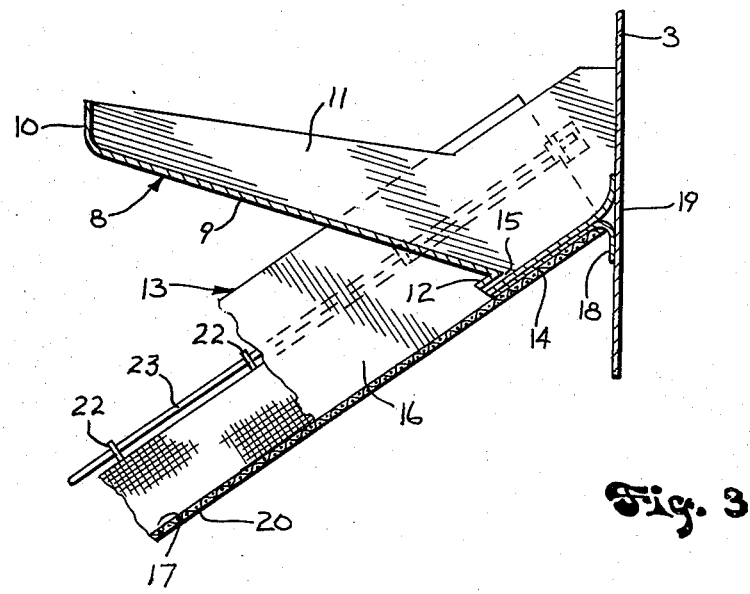
FIG. 3 is an enlarged view showing the downstream end of the delivery trough and the upstream end of the separating screen.

As shown in FIGS. 1 and 2, the trough includes an inclined bottom wall 9, an end wall 10 and a pair of side walls 11. The low end of bottom wall 11 is formed with a reverse bend 12, as best shown in FIG. 3, which is spaced slightly above the bottom wall 13 of a second inclined trough 14 to define a slot 15. As shown in FIG. 2, the trough 14 is located beneath the delivery trough 8 and is sloped or inclined in the opposite direction. The lower trough 14 is provided with a pair of side walls 16 which extend between the side walls 3 of the housing, and the central portion of the bottom wall 13 is formed with an opening 17. As shown in FIG. 3, the high end of the bottom wall 14 has a downwardly extending flange 18 which is secured to the side wall 3, and an upwardly curved baffle 19 is mounted above flange 18 and is connected between the bottom wall 14 and side wall 3 to provide a smoothly curved surface for directing the whey into the slot 15.

Located across the opening 17 in the lower trough 13 is a porous screen 20, preferably formed of a woven plastic material such as polyester, polypropylene or nylon. The lower edges of the side walls 16 bordering the opening 17 are curved upwardly, as indicated by 21, and the side portions of screen 20 are disposed over the curved edges. Eyes 22 are secured at spaced intervals along the length of each side edge of the screen 20, and a rod 23 extends within the eyes along each side edge, and the rods 23 are received within one of a series of notches 24 in the side edge of brackets 25 which are mounted on the side walls 16. By positioning the rods 23 in one of the several notches 24, the tension on the screen 20 can be varied, and by removal of the rods 23 from the notches 24, the screen can be readily removed for repair or replacement.

The lower edge of the screen 20 terminates short of the lower end of the opening 17 to provide a gap 26. Located beneath the screen 20 is a whey bin 27, while located beneath the gap 26 is a slurry bin 28 which is separated from the whey bin by a divider wall 29. Both the whey bin 27 and the slurry bin 28 are provided with sloping, hopper-type bottoms which drain toward outlet conduits 30 and 31, respectively, which are connected to pumps 32 and 33.

In order to provide the desired separation of whey and retain a portion of the whey with the fines in the form of a slurry, it is necessary to coordinate the inclination of the screen 20 with its mesh size. It has been found that utilizing a mesh size in the range of 80 to 150 mesh, along with inclination of 30° to 40° with respect to the horizontal, and preferably about 30° will provide the desired manner of separation.

As shown in FIG. 2, a liquid level probe 34 may be located within one of the bins 27 and 28 and operates to automatically start operation of both pumps 32 and 33 when the liquid level rises to the level of the probe. The probe is connected in an electrical circuit with the pumps and a timer so that the pumps will operate for a given period of time sufficient to substantially drain the whey and slurry from the respective bins.

The housing 1 can be provided with one or more windows or observation openings 35.

In operation, the whey containing the curd fines is introduced into the conduit 7 and flows downwardly along the bottom wall 11 of the upper inclined trough 8. The flow of the whey is reversed at the low end of trough 8 and the whey then passes through the slot 15 which serves to distribute the whey in a layer over the inclined screen 20. As the whey flows downwardly along the screen, a portion of the whey will pass through the porous screen for collection in the whey bin 27, while the remaining portion of the whey and the fines will be discharged from the lower end of the screen through the gap 26 into the slurry bin. When the liquid level in the whey bin reaches the level of the probe 34, the probe will operate the pumps to remove the whey in the slurry from the respective bins.

As the curd fines are not completely separated from the whey but are in the form of a slurry, there is no tendency for the fines to dry out. Thus, the fines retain their color and texture and can be immediately returned through operation of the pump 33 to the cheese making vat for incorporation in the same batch, or a new batch, of cheese.

The separating apparatus of the invention is a simplified construction having no moving parts other than the discharge pumps 32 and 33. This not only reduces the cost of the unit, but substantially facilitates the cleaning in place of the entire unit.

Various modes of carrying out the invention are contemplated as being within the scope of the following claims particularly pointing out and distinctly claiming the subject matter which is regarded as the invention.

I claim:

1. An apparatus for separating curd fines from whey, comprising a delivery member to receive whey containing curd fines, an inclined separating trough located at the downstream end of the delivery member to received curds and whey from said delivery member, said separating trough including a frame having a pair of side walls and having an opening disposed between the side walls, a flexible removable screen disposed across said opening, the side edge of the screen extending laterally beyond said side walls, mounting means for removably mounting the side edges of the screen to said frame and located at a level above the bottom edge of said side walls, said side edges of the screen extending over the respective bottom edges of the side walls and extending upwardly to said mounting means, said mounting means including a rod secured to at least one side edge of the screen, adjusting means for adjusting the lateral tension on said screen, said adjusting means comprising a bracket disposed on said frame outwardly adjacent a side wall and having a series of laterally spaced connecting elements to receive the rod, positioning the rod within the respective connecting elements serving to adjust the lateral tension on the screen, whey collection means located beneath the screen to collect whey passing through the screen as the whey and cured fines flow downwardly along the screen, and second collection means located at the low end of the screen to collect the remaining portion of the whey and the curd fines.

2. The apparatus of claim 1, wherein said screen is made of plastic material and has a mesh size in the range of 80 to 150 mesh and is disposed at an angle of 30° to 40° with respect to a horizontal plane.

3. The apparatus of claim 1, wherein the edges of the side walls bordering the opening are curved and the side edges of the screen are engaged with said curved edges.

4. An apparatus for separating curd fines from whey comprising, a closed housing, the lower portion of said housing defining a first collection bin and a second collection bin disposed in a side-by-side relation, inlet means in the upper portion of the housing for receiving a mixture of whey and curd fines, an inclined stationary delivery trough disposed to receive said mixture from the inlet means, an inclined separating trough located beneath the delivery trough and having an upstream end to receive said mixture from the downstream end of the delivery trough, said separating trough having a pair of side walls and having a bottom with an opening therein, said opening being disposed above said first bin, the downstream end of the separating trough being disposed above said second bin, a removable flexible screen disposed across the opening, mounting means for removably mounting the side edges of the screen to said separating trough, said mounting means being located at a level above the bottom edge of said side walls, said side edges of the screen extending over the respective bottom edges of the side walls and extending upwardly to said mounting means, a rod secured to each side edge of the screen, and adjusting means for adjusting the lateral tension on said screen to thereby maintain said screen in a relatively taut condition across said opening, said adjusting means comprising a bracket disposed on said separating trough outwardly adjacent each side wall and having a series of laterally spaced notches to receive the respective rod, positioning the rod within the respective notches serving to adjust the lateral tension on the screen, the mixture of whey and curd fines flowing downwardly on said delivery trough and then along the separating trough with a portion of the whey passing through the screen and being collected in said first bin and the remaining portion of the whey and the curd fines being discharged from the downstream end of the separating trough into said second bin.

* * * * *